(12) United States Patent
McIntyre

(10) Patent No.: US 6,244,604 B1
(45) Date of Patent: Jun. 12, 2001

(54) SUSPENSION ADJUSTER

(76) Inventor: Kevin Joseph McIntyre, 138 Oxford Street, Woollahra, New South Wales, 2025 (AU)

( * ) Notice: Subject to any disclaimer, the term of this patent is extended or adjusted under 35 U.S.C. 154(b) by 0 days.

(21) Appl. No.: 09/466,272

(22) Filed: Dec. 17, 1999

(30) Foreign Application Priority Data

Dec. 17, 1998 (AU) .................................................... PP7765

(51) Int. Cl.⁷ ................................................ B62D 17/00
(52) U.S. Cl. ........................................ 280/86.753; 403/4
(58) Field of Search .................... 280/86.754, 86.755, 280/86.753, 86.751, 86.75, FOR 112; 403/4

(56) References Cited

U.S. PATENT DOCUMENTS

| | | | |
|---|---|---|---|
| 4,733,884 | * | 3/1988 | Pettibone et al. ............... 280/86.753 |
| 4,736,964 | * | 4/1988 | Specktor .......................... 280/86.753 |
| 5,044,659 | * | 9/1991 | Specktor et al. ................ 280/86.753 |

* cited by examiner

*Primary Examiner*—Peter C. English
(74) *Attorney, Agent, or Firm*—Ladas & Parry

(57) ABSTRACT

A wheel alignment adjuster for a motor vehicle suspension of a twin-flange strut-type comprises an elongate plate having a transverse slot. A bolt passes through aligned upper holes in the flanges of the suspension strut and the bolt engages through the transverse slot in the plate. The bolt has a non-circular cross-section with a cam washer having an aperture corresponding in shape and size to the cross section of the bolt but having a circular periphery, the aperture in the cam washer being offset from its center; the periphery of the cam washer is restrained between side flanges extending from the front face of the plate. The adjustor is installed by: removal of one of the bolts which normally fixes the vehicle hub mounting arm to the twin flanges, boring out substantially the bolt holes in the flanges, installing the adjuster bolt through the enlarged holes with protrusions from the rear of the plate engaging in upper and lower portions of the enlarged hole to locate the transverse slot centered on the hole, rotating the bolt head to displace the bolt along the slot to the preferred position to set the wheel camber, and applying a securing nut to the free end of the bolt to clamp the suspension in the selected position.

7 Claims, 2 Drawing Sheets

SUSPENSION ADJUSTER

FIELD OF THE INVENTION

This invention relates to a suspension adjuster and has been devised particularly though not solely for adjusting the camber of a motor vehicle wheel supported by a twin flange strut-type motor vehicle suspension.

BACKGROUND OF THE INVENTION

Many forms of motor vehicle suspension use a telescopic strut having its upper end mounted to the body or chassis of the motor vehicle and the lower end provided with a pair of transversely extending parallel flanges (or plates) which typically each extend in a substantially vertical plane and between which is bolted and support for the motor vehicle wheel hub assembly. The telescopic strut commonly has a coiled spring engaged coaxially about the strut.

Strut-type suspensions of this nature are very common, particularly on the front suspension of a motor vehicle. However, many forms of such suspensions commonly in use on motor vehicles do not make any, or adequate, provision for camber alignment adjustment of a wheel mounted on the wheel hub. Such adjustment is desirable to correct misalignment due to suspension wear or sagging or to correct minor defects after collision damage has been repaired or after the vehicle suspension has been misaligned following impact with an object such as a curb or porthole. If the camber adjustment on a motor vehicle wheel is not correct, steering problems may result and tire wear becomes significant.

SUMMARY OF THE INVENTION

The present invention therefore provides a suspension adjuster for modifying a twin-flange strut-type vehicle suspension to permit chamber adjustment, the suspension having spaced, parallel flanges each extending in a substantially vertical plane transversely directed relative to the vehicle, and wherein a vehicle hub mounting arm has an upper end portion located between the flanges and is fixed by upper and lower bolts passing through respective aligned bores in the flanges and the mounting arm, the suspension adjuster being adapted to be applied after removal of one of the suspension bolts and enlargement of the diameter of the bores in the flanges, the suspension adjuster comprising:

(a) a plate having front and rear faces with a slot extending through and across the plate, (b) side flanges adjacent the ends of the slot and extending from the front of the plate, (c) a bolt having a head, a non-circular cross-section shank portion and a screw-thread free end portion for receiving a securing nut, (d) the non-circular shank portion being adapted to be received in the slot in the plate and the bolt also being adapted to extend through aligned holes in the twin flanges and mounting arm of the suspension, (e) a cam washer to be located between the head of the bolt and the front face of the plate and having a substantially circular periphery and an offset non-circular aperture through the washer for engaging the washer on the non-circular shank portion of the bolt for rotation therewith, (f) the periphery of the cam washer locating for restraint between the side flanges of the plate whereby upon application of torque to the head of the bolt it rotates with the cam washer thereby displacing the bolt along the transverse slot to adjust camber in the vehicle suspension, (g) means for restraining movement of the plate in the longitudinal direction of the transverse slot during camber adjustment, and (h) the plate having protrusion means extending from the rear face of the plate adjacent the slot for engaging in the enlarged bore of one of the flanges to keep the slot and the bolt in registry with the bore.

Preferably the face of the cam washer adjacent the plate has sharp protruding teeth adapted to bit into and engage surfaces of the plate when the nut is tightened on the bolt.

Preferably, the adjuster includes a backwasher to lie under the nut and against an outer face of the flange of the vehicle suspension and most preferably sharp protruding teeth extend from the backwasher to bite into the flange when the nut is tightened.

Preferably the blot has a D-shaped screw-threaded across-section shank and both the cam washer and the backwasher have corresponding D-shaped holes therethrough causing the cam washer and the backwasher to rotate with the bolt.

In a further aspect the present invention provides a method of adjusting the camber of a motor vehicle wheel supported by a twin flange strut-type suspension, said method comprising the steps of removing one of the mounting bolts (either upper or lower) through the aligned holes in the twin flanges, pivoting the wheel hub support member about the lower mounting bolt downwardly disengaging the hole in the support member from the aligned upper holes in the twin flanges and allowing free passage of a drill through the aligned upper holes in the twin flanges, enlarging the size of the aligned upper holes in the twin flanges using a suitable drill or other bit, returning the wheel hub support member to a position where its upper mounting hole is aligned with the now enlarged holes in the twin flanges, engaging a wheel alignment adjuster of the type defined above with the aligned upper holes in the twin flanges and wheel hub support member by passing the bolt of the wheel alignment through those aligned holes, engaging the backwasher and nut of the wheel alignment adjuster with the bolt of the wheel alignment adjuster, rotating the head of the bolt of the wheel alignment adjuster causing the bolt to move from side to side within the transverse slot under the action of the cam washer until the desired camber setting is achieved, and tightening the nut to lock the assembly securely in place and maintain the required camber setting.

Notwithstanding any other forms that may fall within its scope, one preferred form of the invention will now be described by way of example only with reference to the accompanying drawings, wherein.

Figure 1:
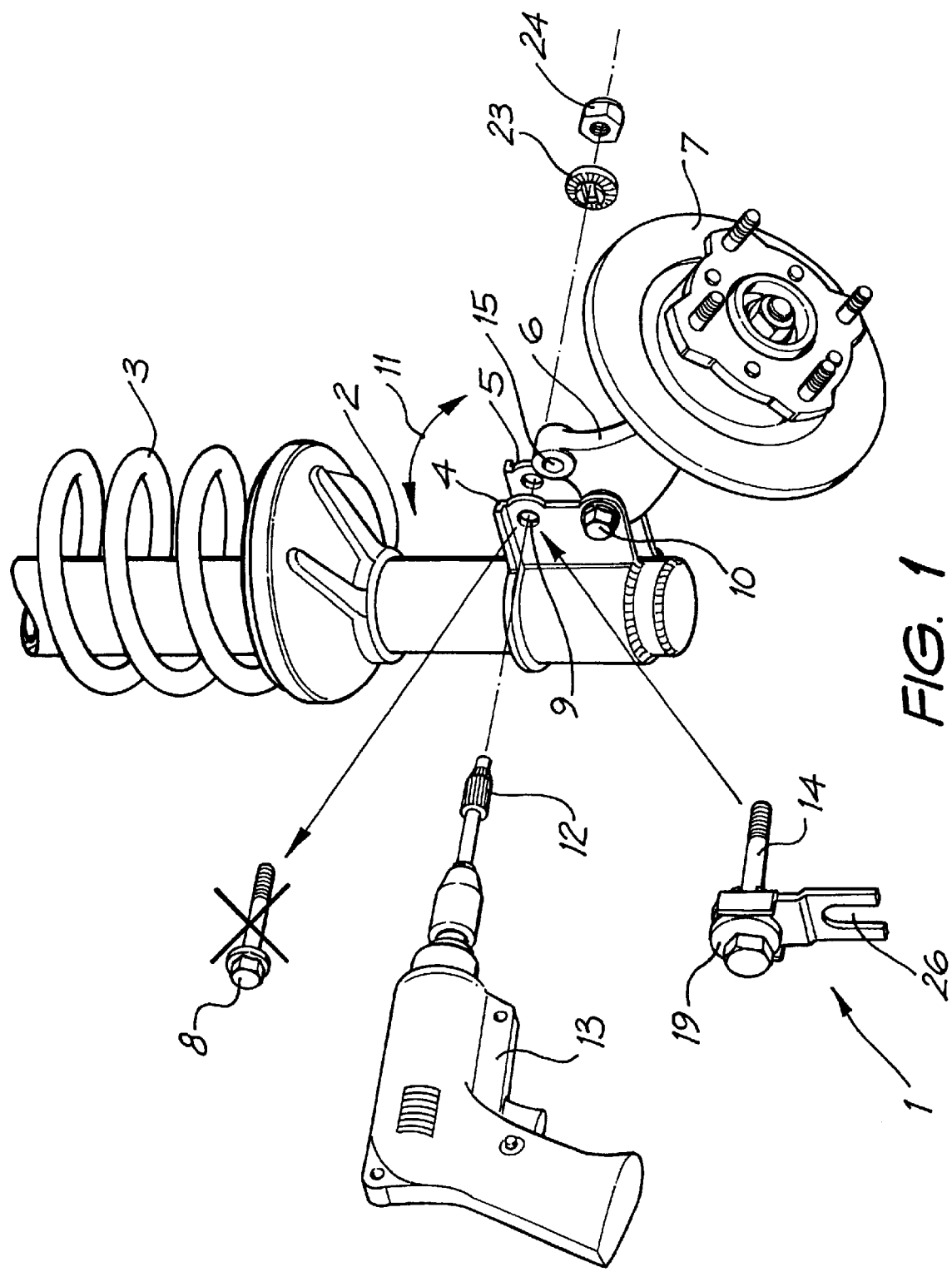
FIG. 1 is a perspective view of the lower end of a twin flange strut-type motor vehicle suspension showing the upper mounting bolt removed and the wheel hub support member pivoted downwardly for engagement of a wheel alignment adjuster according to the invention.

In the preferred form of the invention a camber adjuster of the type shown at 1 is provided for a motor vehicle suspension having a strut 2 typically with a coaxial coil spring 3 and pair of parallel flanges 4 and 5 between which is mounted a support 6 for a motor vehicle hub 7. This support 6 is normally bolted between the flanges by way of an upper bolt 8 through aligned holes 9 and a lower bolt 10.

To use the adjuster according to the invention, the upper bolt 8 is removed as shown in FIG. 1, and the wheel hub pivoted downwardly as indicated by arrow 11 to the position shown in FIG. 1 leaving aligned apertures 9 free. The apertures in both flanges 4 and 5 are then enlarged in size by way of a drill or reaming bit 12 in a power drill 13 before the vehicle hub 7 is pivoted upwardly and a bolt 14 from the adjuster 1 passed through the aligned apertures 9 and the upper bolt hole 15 in the hub support member as described below.

Figure 4:
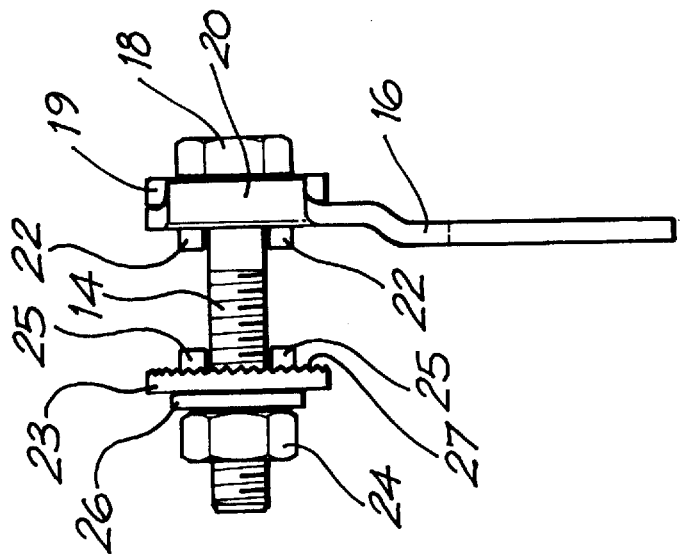
FIG. 4 is a side view of the wheel alignment adjuster shown in FIG. 2.
Figure 3:
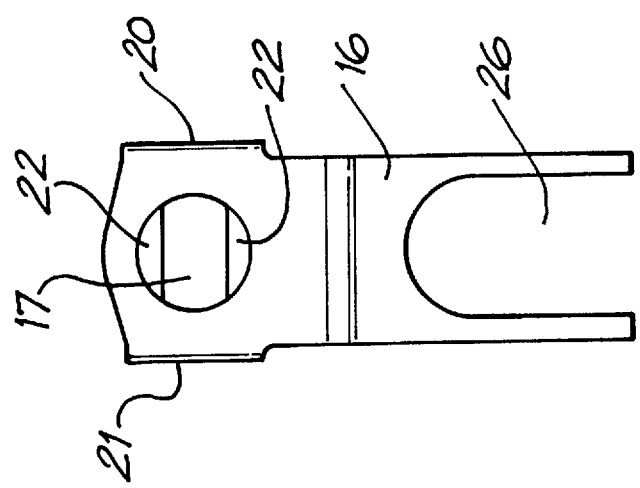
FIG. 3 is a rear view of the wheel alignment adjuster shown in FIG. 2 with the bolt and washers removed for clarity.
Figure 2:
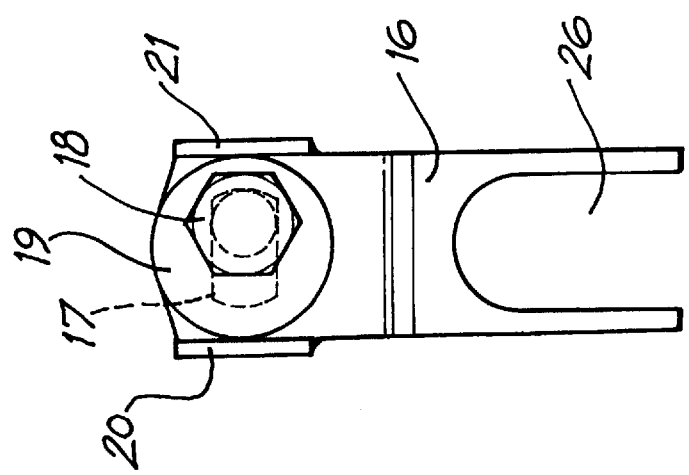
FIG. 2 is a front view of a wheel alignment adjuster according to the invention.

The wheel alignment adjuster is described in more detail with reference to FIGS. 2 and 4 and comprises an elongate plate 16 having a transverse slot 17 therethrough adjacent the upper end of the plate and a bolt 14 having a head 18 which passes through the elongate slot 17.

The bolt is provided of non-circular cross section, and typically D shaped section (not shown) and passes through a cam washer 19 which has a circular periphery and an aperture therethrough corresponding in size and shape to the non-circular cross section of the bolt. The aperture is offset from the centre of the cam washer as can be clearly seen in FIG. 2 and the cam washer in turn is located between a pair of side flanges 20 and 21 so as to be restrained to rotate in the same lateral position relative to the plate 16.

It will be apparent that rotation of the bolt 14 eg, by a spanner engaged with head 18 will cause rotation of the cam washer 19, causing the bolt to move from side to side within the transverse slot 17.

The adjuster further comprises protrusions 22 from the rear face of the plate 16 adjacent the transverse slot 17, the protrusions being sized and shaped to fit within the enlarged upper holes 9 in the flanges 4 or 5 of the motor vehicle suspension strut.

The adjuster is further provided with a similar back washer 23 with protrusions 25 to engage in the enlarged bore in the flange 5 and to centre the bolt, a flat washer 26 and a nut 24 to engage the adjuster with the wheel strut assembly as previously described.

The lower end of the plate 16 is further provided with a longitudinal recess 26 adapted to engage over the bolt head of the lower mounting bolt 10 engaged through the lower holes in the flanges of the suspension strut.

In use the holes 9 in the strut flanges are enlarged as previously described and the bolt 14 passed through the aligned holes and the hole 15 in the hub assembly. The lower bolt head sits within the recess 26 preventing rotation of the wheel alignment adjuster 1 relative to the face of the strut flange 4.

The camber of a wheel mounted on the hub 7 can then be adjusted by rotating the bolt head 18, causing the bolt to move from side to side guided by the transverse slot 17 while the upper end of the wheel alignment adjuster remains securely in place on the flange 4 by the interaction of the protrusions 22 within the periphery of the enlarged hole 9.

Because the bolt 14 is a snug fit within the hole 15 in the wheel hub support member 6, this transverse movement of the bolt relative to the strut flanges causes the hub assembly to tilt and enables the camber of the attached wheel to be adjusted.

When the desired camber setting is reached, the bolt head 18 is held firmly in the desired location while the nut 24 is tightened.

Both the back washer 23 and the cam washer 19 are preferably provided with teeth 27 adapted to engage the face of the flange 5 and the front face of the alignment adjuster plate 16 respectively when the nut 24 is tightened to a desired torque, in order to secure the entire assembly in the adjusted position.

In this manner the camber of a wheel held in strut type suspension can be readily and simply adjusted to the desired setting without the use of any complex tools or labour intensive slotting.

What is claimed is:

1. A suspension adjuster for modifying a twin-flange strut vehicle suspension to permit camber adjustment, the suspension having spaced, parallel flanges each extending in substantially vertical planes transversely directed relative to the vehicle, and wherein a vehicle hub mounting arm has an upper end portion located between the flanges and is fixed by upper and lower bolts passing through respective aligned bores in the flanges and the mounting arm, the suspension adjuster being adapted to be applied after removal of one of the suspension bolts and enlargement of the circular diameter of the bores in the flanges, the suspension adjuster comprising:

a) a plate having front and rear faces with a slot extending through and across the plate, b) side flanges adjacent the ends of the slot and extending from the front of the plate, c) a bolt having a head, a non-circular cross-section shank portion and a screw-thread free end portion for receiving a securing nut, d) the non-circular shank portion being adapted to be received in the slot in the plate and the bolt also being adapted to extend through aligned bores in the twin flanges and mounting arm of the suspension, e) a cam washer to be located between the head of the bolt and the front face of the plate and having a substantially circular periphery and an offset non-circular aperture through the washer for engaging the washer on the non-circular shank portion of the bolt for rotation therewith, f) the periphery of the cam washer locating for restraint between the side flanges of the plate whereby upon application of torque to the head of the bolt it rotates with the cam washer thereby displacing the bolt along the transverse slot to adjust camber in the vehicle suspension, g) means for restraining movement of the plate in the longitudinal direction of the transverse slot during camber adjustment, and h) the means for restraining including a protruding structure extending from the rear face of the plate adjacent the slot for engaging in the enlarged bore of one of the flanges to keep the slot and the bolt in registry with the bore.

2. A suspension adjuster as claimed in claim 1, wherein the face of the cam washer adjacent the plate has sharp protruding teeth adapted to bite into and engage a front surface of the plate when the nut is tightened on the bolt.

3. A suspension adjuster as claimed in claim 1, wherein the adjuster includes a back washer to lie under the nut and against an outer face of one of the flanges of the vehicle suspension, with sharp protruding teeth extending from the back washer to bit into the one flange when the nut is tightened.

4. A suspension adjuster as claimed in claim 3, wherein the bolt has a D-shaped cross-sectional shank portion and both the cam washer and the back washer have corresponding D-shaped holes therethrough causing the cam washer and the back washer to rotate with the bolt.

5. A suspension adjuster as claimed in claim 1, wherein it is adapted to be applied to the upper mounting bolt position in the vehicle suspension.

6. A vehicle suspension modified by inclusion of a suspension adjuster as claimed in claim 1.

7. A suspension adjuster is claimed in claim 1 wherein the means for restraining further includes an end portion of the plate remote from the said slot and defining a recess adapted to engage with the other of the suspension bolts for resisting movement of the plate in a direction along the transverse slot.

* * * * *